(12) United States Patent
Kim et al.

(10) Patent No.: US 8,149,362 B2
(45) Date of Patent: Apr. 3, 2012

(54) LIQUID CRYSTAL DISPLAY DEVICE AND FABRICATION METHOD THEREOF

(75) Inventors: Jae Hoon Kim, Yongin-si (KR); You Jin Lee, Seoul (KR); Hak Rin Kim, Seoul (KR); Jong Wook Jung, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 776 days.

(21) Appl. No.: 12/087,891

(22) PCT Filed: Jan. 17, 2007

(86) PCT No.: PCT/KR2007/000273
§ 371 (c)(1),
(2), (4) Date: Jul. 17, 2008

(87) PCT Pub. No.: WO2007/083915
PCT Pub. Date: Jul. 26, 2007

(65) Prior Publication Data
US 2008/0316407 A1    Dec. 25, 2008

(30) Foreign Application Priority Data
Jan. 18, 2006    (KR) .................. 10-2006-0005467

(51) Int. Cl.
G02F 1/1337    (2006.01)
G02F 1/13    (2006.01)

(52) U.S. Cl. ........................... 349/129; 349/187
(58) Field of Classification Search .................. 349/187, 349/129
See application file for complete search history.

(56) References Cited

U.S. PATENT DOCUMENTS

| | | |
|---|---|---|
| 7,095,468 B2 | 8/2006 | Lee |
| 2003/0142256 A1* | 7/2003 | Maeda et al. .............. 349/115 |
| 2004/0241319 A1 | 12/2004 | Sa et al. |
| 2005/0126410 A1 | 6/2005 | Won et al. |
| 2006/0164578 A1* | 7/2006 | Matsumoto et al. .......... 349/117 |
| 2006/0285044 A1* | 12/2006 | Liu et al. .................. 349/123 |
| 2007/0121045 A1* | 5/2007 | Kim .......................... 349/123 |

FOREIGN PATENT DOCUMENTS
WO    WO 2004029700 A1 *    4/2004
* cited by examiner

Primary Examiner — Mark Robinson
Assistant Examiner — Michael Inadomi
(74) Attorney, Agent, or Firm — Harness, Dickey & Pierce, P.L.C.

(57) ABSTRACT

A liquid crystal display (LCD) device having an alignment film of which pretilt angle and azimuthal angle can be adjusted without ultraviolet irradiation and a method for fabricating the LCD device are provided. A liquid crystal display having a thin film transistor substrate and a color filter substrate facing each other and a liquid crystal layer sealed between the substrates includes a first alignment film having a pattern which defines a first and second alignment domains on the thin film transistor substrate and a second alignment film formed on the color filter substrate.

11 Claims, 9 Drawing Sheets

[Fig. 1]
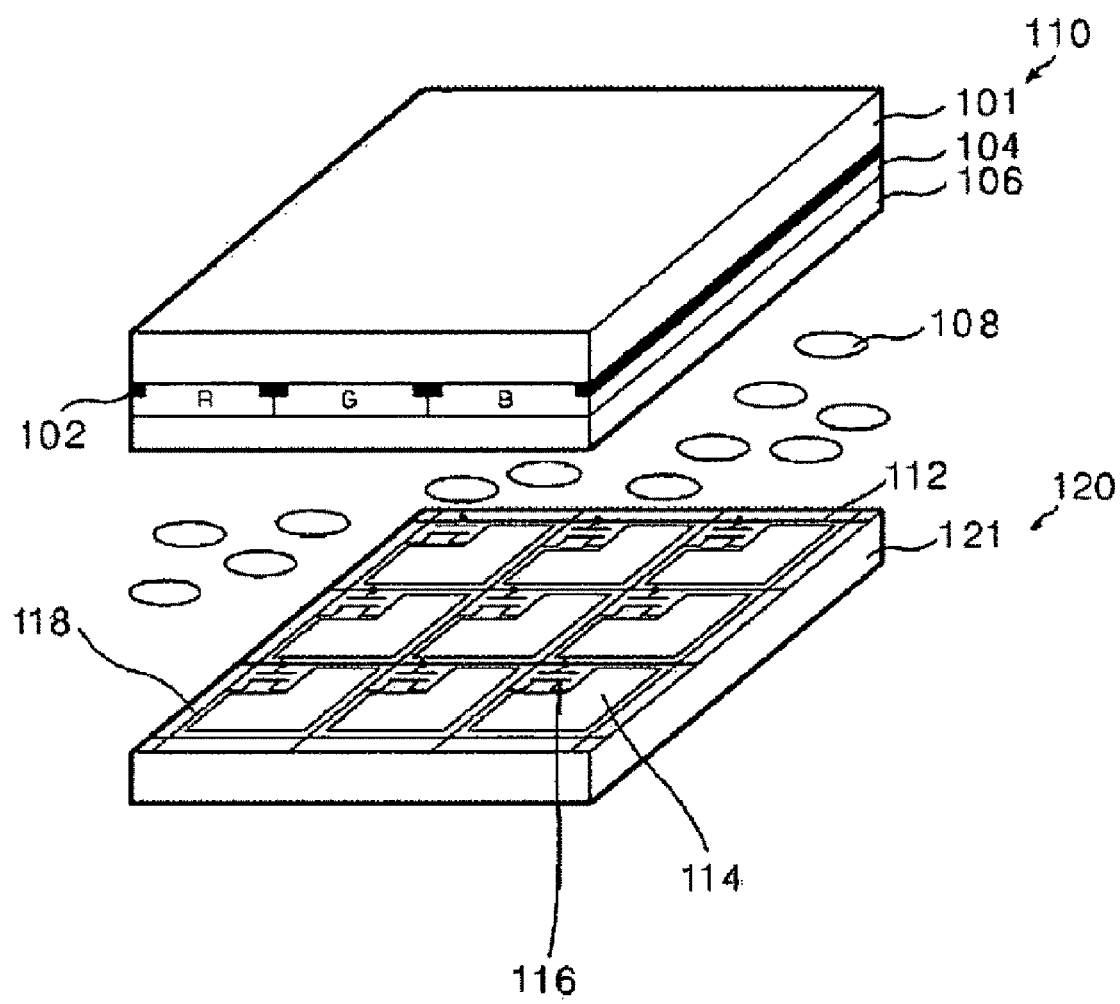

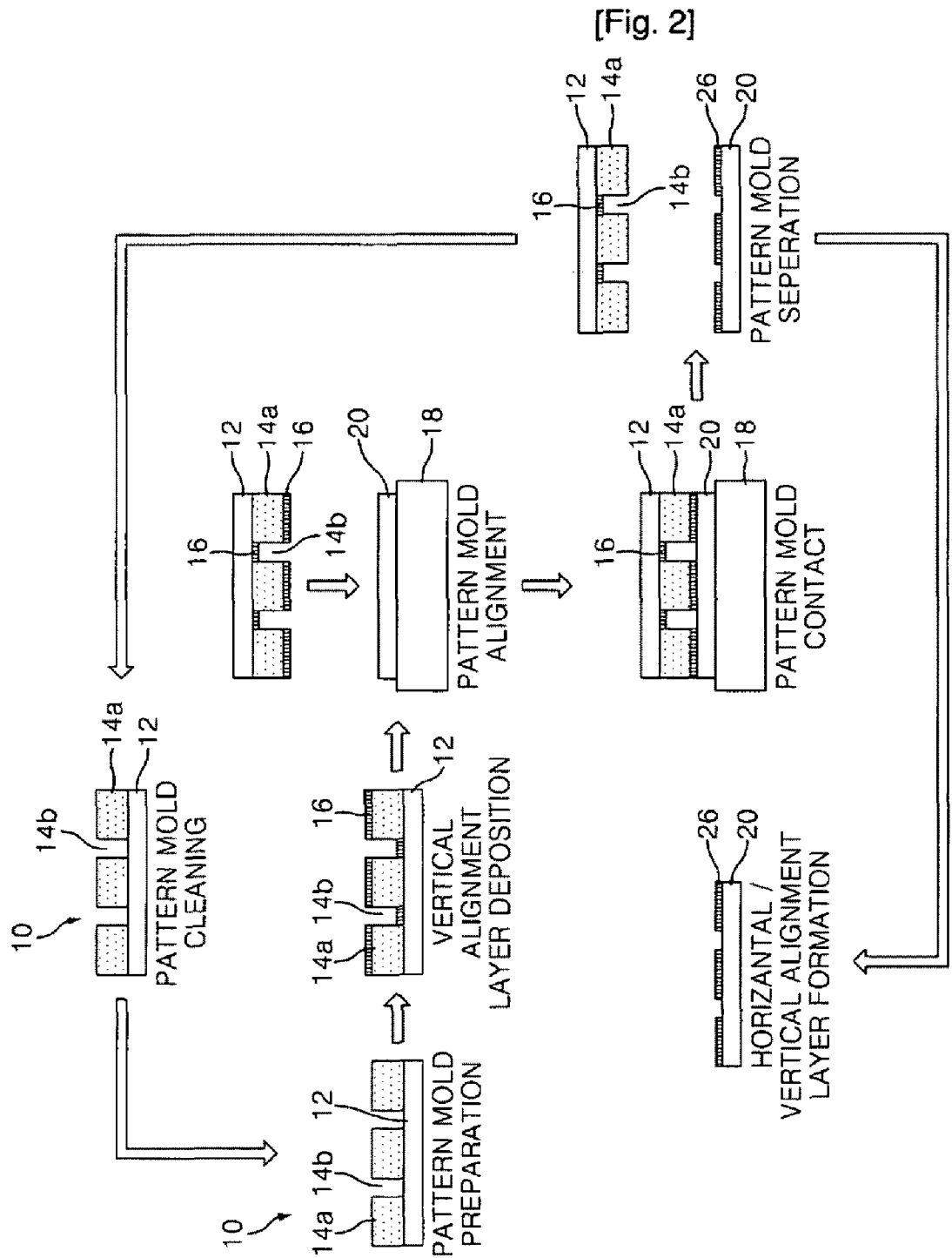

[Fig. 3]
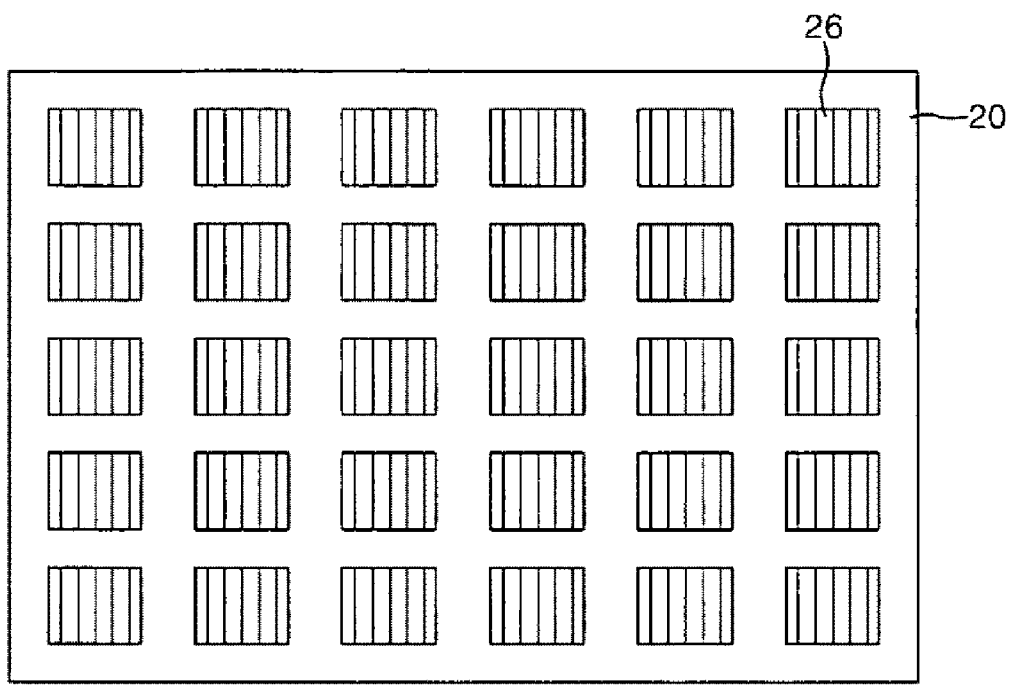

[Fig. 4]
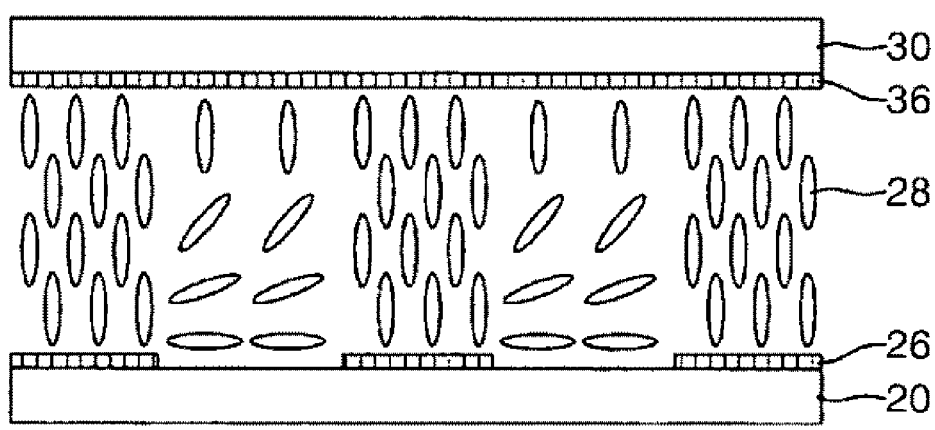

[Fig. 5]
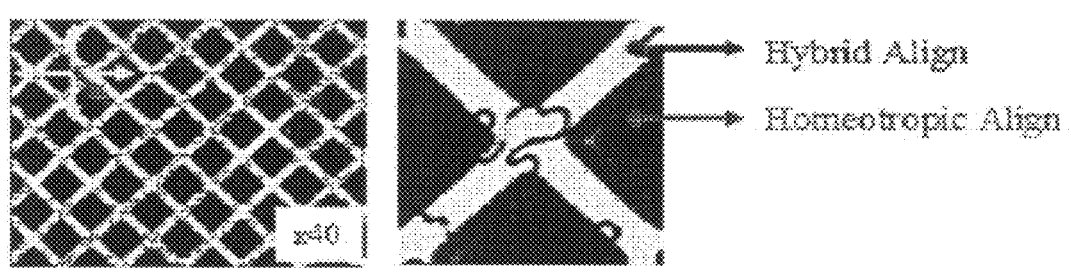

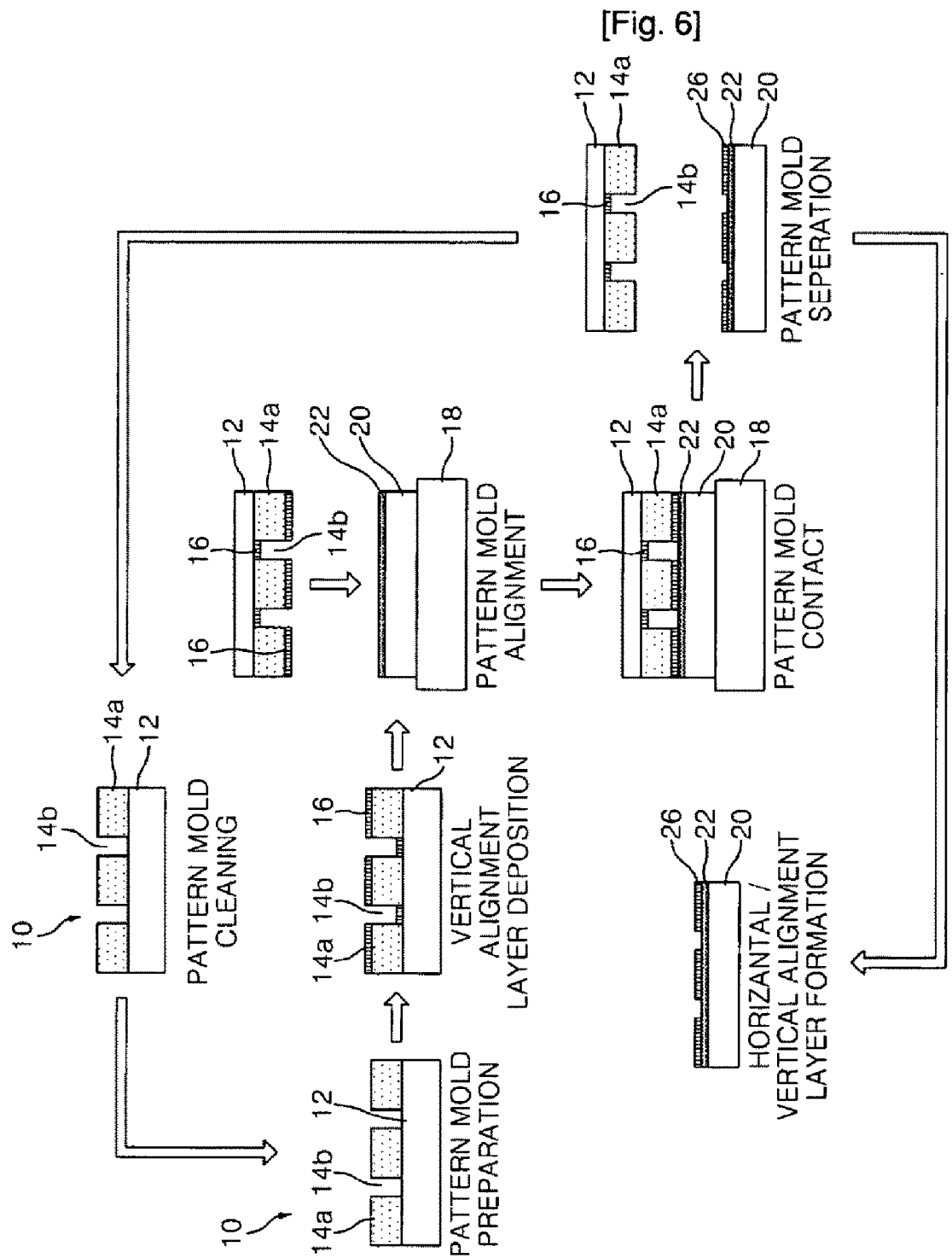

LIQUID CRYSTAL DISPLAY DEVICE AND FABRICATION METHOD THEREOF

TECHNICAL FIELD

The present invention relates to a liquid crystal display (LCD) device and, in particular, to an LCD device having an alignment film of which pretilt angle and azimuthal angle can be adjusted without ultraviolet irradiation and a method for fabricating the LCD device.

BACKGROUND ART

LCD devices control light transmissivity characteristics of liquid crystal materials with electronic fields to display pictures. Thus, LCD devices typically include an LCD panel having a thin film transistor (TFT) substrate 120 and a color filter substrate 110 facing each other by interposing a spacer for maintaining a gap between two substrates 110 and 120, the gap is filled with liquid crystal 108, as shown in FIG. 1.

The TFT substrate 112 includes a plurality of gate lines 112 and data lines 118 perpendicularly crossing the gate lines, a plurality of TFTs 116 formed at cross sections of the gate and data lines 112 and 118, a pixel electrodes 114 connected to the TFTs 116, and a lower alignment film applied thereon.

The color filter substrate 110 includes a color filter 104, a black matrix 102 for preventing leakage of light, a common electrode 106 for forming a vertical electric field in cooperation with the pixel electrode 114, and an upper alignment film applied thereon.

The liquid crystal is driven by a vertical electric field generated between the pixel electrode 114 and the common electrode 106. However, the conventional LCD device has about 90 degree viewing angle.

In order to improve viewing angle, a multi domain technique has been proposed. In the multi domain technique, the alignment film is formed such that the alignment direction is adjusted using light. Accordingly, the liquid crystal molecules are induced to align in various directions.

DISCLOSURE OF INVENTION

Technical Problem

In order to adjusting the alignment direction of the alignment film, an ultraviolet light is irradiated on the alignment film. However, the conventional multi domain technique generates radicals due to a photochemical reaction between the ultraviolet light and the alignment film, resulting in ghost image of the LCD device.

Technical Solution

The present invention has been made in an effort to solve the above problems, and it is an object of the present invention to provide an LCD device and method for fabricating the LCD device, that are capable of adjusting pretilt angle and azimuthal angle of the alignment film of the LCD device without using ultraviolet irradiation.

Advantageous Effects the LCD device and method for fabricating the LCD device according to the present invention is characterized in that the alignment film is produced by a contact printing technique, whereby it is possible to implement a multi domain alignment film having different pretilt angles without irradiation of ultraviolet light.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

BRIEF DESCRIPTION OF THE DRAWINGS

The above and other objects, features and advantages of the present invention will be more apparent from the following detailed description in conjunction with the accompanying drawings, in which:

FIG. 1 is a perspective view illustrating a conventional LCD device;

FIG. 2 is a block diagram illustrating a procedure for producing an alignment film of an LCD device according to an exemplary embodiment of the present invention;

FIG. 3 is a schematic view illustrating a lower substrate having a vertical alignment film produced through the procedure of FIG. 2;

FIG. 4 is a cross sectional view illustrating an LCD device according to an exemplary embodiment of the present invention;

FIG. 5 is an enlarge plan view illustrating alignment film of the LCD device of FIG. 4.

FIG. 6 is a block diagram illustrating a procedure for producing an alignment film of an LCD device according to another exemplary embodiment of the present invention;

MODE FOR THE INVENTION

Figure 7A:
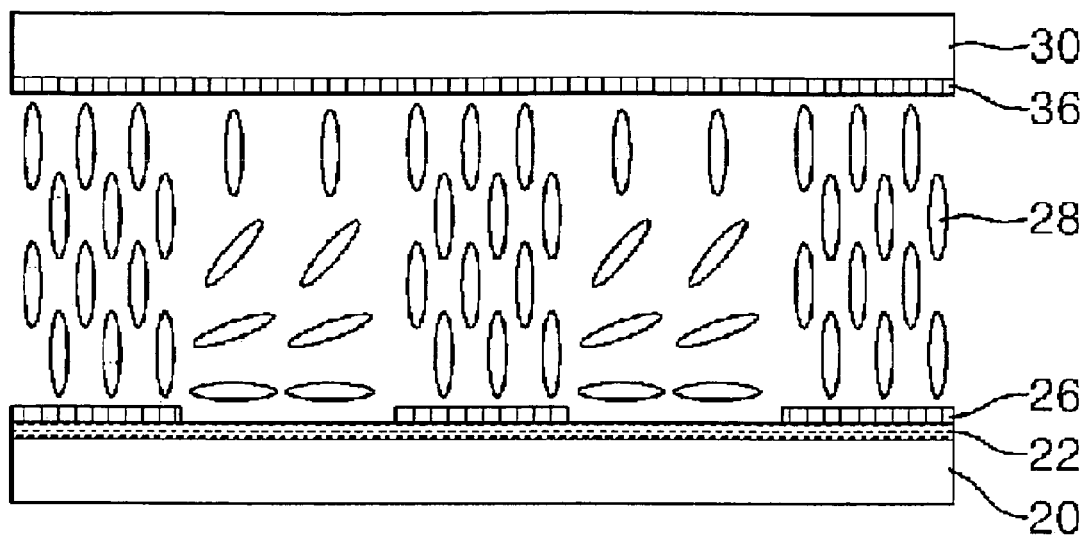
FIG. 7a is a cross sectional view illustrating an LCD device according to another exemplary embodiment of the present invention.

In accordance with an aspect of the present invention, the above and other objects can be accomplished by a method for fabricating a liquid crystal display device. The method for fabricating a liquid crystal display device includes producing an alignment film having multiple alignment directions; and forming a liquid crystal layer in which liquid crystal molecules are aligned according to the multiple alignment directions.

Preferably, the alignment directions of the alignment film are determined dependent on subpixels of the liquid crystal device.

Preferably, the alignment film has multiple alignment directions for a subpixel.

Preferably, producing an alignment film includes forming a pattern mold having a plurality of protrusions; depositing an alignment material on the pattern mold; printing the alignment material on a substrate by contacting the protrusions of the pattern mold on the substrate; and separating the pattern mold from the substrate.

Preferably, producing an alignment film includes forming a vertical alignment film on a first substrate; preparing a pattern mold having at least one protrusion; depositing an alignment material on the pattern mold; printing an alignment film by pressing the pattern mold on a second substrate; and separating the pattern mold from the second substrate.

Preferably, producing an alignment film includes forming one of a vertical or horizontal alignment film on a first substrate; forming a horizontal alignment film on a second substrate; preparing a pattern mold having at least one protrusion; depositing an alignment material on the pattern mold; printing the alignment film on the second substrate by pressing the pattern mold on the second substrate; and separating the pattern mold from the second substrate.

Preferably, producing an alignment film includes forming a horizontal alignment film on a first substrate; forming a horizontal alignment film on a second substrate; preparing a pattern mold having at least one protrusion; depositing a polymer on the pattern mold; printing alignment films on the first and second substrates by pressing the pattern mold on the first and second substrates; and separating the pattern mold from the first and second substrates.

Preferably, producing an alignment film includes forming a polymer layer for aligning the liquid crystal molecules in vertical direction to the first substrate; forming a horizontal alignment layer on a second substrate; preparing a pattern mold having at least one protrusion; depositing a polymer material on the pattern mold; printing the polymer material on the second substrate by pressing the pattern mold on the second substrate; and separating the pattern mold from the second substrate.

In accordance with another aspect of the present invention, the above and other objects are accomplished by a method for fabricating a liquid crystal display device. The method for fabricating a liquid crystal display device includes forming an alignment film having multiple pretilt angles; forming a liquid crystal layer in which liquid crystal molecules are aligned according to the multiple pretilt angles of the alignment film.

Preferably, the pretilt angles are formed for respective sub-pixels.

Preferably, the pretilt angles are formed for a single sub-pixel.

Preferably, forming an alignment film includes preparing a pattern mold having a plurality of protrusions; depositing an alignment material on the protrusions; printing the alignment material on a substrate by pressing the pattern mold such that the protrusions contact the substrate; and removing the pattern mold from the substrate.

In accordance with another aspect of the present invention, the above and other objects are accomplished by a liquid crystal display device. The liquid crystal display device includes an alignment film having multiple pretilt angles; and a liquid crystal layer in which crystal molecules are aligned according to the pretilt angles.

Preferably, the pretilt angles are formed for respective sub-pixels.

Preferably, the pretilt angles are formed for a single sub-pixels.

Preferably, the pretilt angles of the alignment film are aligning the liquid crystal molecules in one of a homeotropic mode, horizontal mode, and vertical mode, and in a hybrid mode.

Preferably, the pretilt angles of the alignment film are aligning the liquid crystal molecules in a twisted nematic (TN) mode and an electrically controlled birefringence (ECB) mode.

In accordance with another aspect of the present invention, the above and other objects are accomplished by a liquid crystal display including a thin film substrate and a color filter substrate facing each other and a liquid crystal layer sealed between the substrates. The liquid crystal display includes a first alignment film having a pattern which defines a first and second alignment domains on the thin film transistor substrate; and a second alignment film formed on the color filter substrate.

Preferably, the first alignment domain is a vertical alignment film for aligning liquid crystal molecules of the liquid crystal layer in a vertical direction perpendicular to the thin film transistor substrate.

Preferably, the second alignment domain is the thin film transistor substrate exposed by the pattern for aligning the liquid crystal molecules in a horizontal direction in parallel with the thin film transistor substrate.

Preferably, the second alignment film is a vertical alignment film for aligning liquid crystal molecules of the liquid crystal layer in a vertical direction perpendicular to the color filter substrate.

Preferably, the first alignment film includes a first alignment layer formed on the thin film transistor substrate; and a second alignment layer formed on the first alignment layer.

Preferably, the first alignment domain is the first alignment layer for aligning crystal molecules of the liquid crystal layer in a vertical direction perpendicular to the thin film transistor substrate.

Preferably, the second alignment domain is second alignment layer exposed by the pattern for aligning the liquid crystal molecules in a horizontal direction in parallel with the thin film transistor substrate.

Preferably, the second alignment film is a vertical alignment film for aligning the liquid crystal molecules of the liquid crystal layer in a vertical direction perpendicular to the color filter substrate.

Preferably, the second alignment film is a horizontal alignment film for aligning the liquid crystal molecules of the liquid crystal layer in a horizontal direction in parallel with the color filter substrate.

Exemplary embodiments of the present invention are described with reference to the accompanying drawings in detail. The same reference numbers will be used throughout the drawings to refer to the same or like parts. Detailed descriptions of well-known functions and structures incorporated herein may be omitted to avoid obscuring the subject matter of the present invention.

While the present invention is susceptible of embodiment in many different forms, there are shown in drawings and will be described herein in detail specific embodiments thereof, with the understanding that the present disclosure is to be considered as an exemplification of the principles of the invention and is not intended to limit the invention to the specific embodiments illustrated.

FIG. 2 is a block diagram illustrating a procedure for producing an alignment film of an LCD device according to an exemplary embodiment of the present invention.

Referring to FIG. 2, a pattern mold 10 is prepared by forming protrusions 14a and slits 14b interposed between the protrusions 14a on a base substrate 12. A vertical alignment layer 16 is coated over a surface of the of the pattern mold 110.

The protrusions 14a are made of an elastic material such as Polydimethylsiloxane (PDMS), Polyurethane, and Crosslinked Novolac Resin and the base substrate 12 is made of a glass or a plastic. The pattern mold 10 is formed through an exposure and development processes after depositing a photosensitive material on elastic material. The photosensitive material is a photosensitive organic material such as a photoresist or a photo acryl.

After the pattern mold 10 is produced, a polyimide is deposited over the pattern mold 10 so as to form a vertical alignment layer 16. After the vertical alignment layer 16 is formed, the pattern mold 10 is aligned over a lower substrate 20 of an LCD panel such that the vertical alignment layer 16 faces the lower substrate 20. At this time, the lower substrate 20 is fixed on a hot plate 18 so as to be heated in a pre-baking temperature.

The pattern mold 10 is pressed on the lower substrate 20 in a predetermined time such that the vertical alignment layer 16 coated on the protrusions 14a is printed on a surface of the lower substrate 20. Since the pressure required for printing the vertical alignment layer 16 on the surface of the lower substrate is enough only with gravity applied to the pattern mold, an additional presser is not required. The vertical alignment layer 16 deposited on the protrusions 14a of the pattern mold 10 is printed on the surface of the lower substrate 20 of the LCD panel.

The vertical alignment layer 16 printed on the surface of the lower substrate 20 is pre-baked such that the solvent is removed, and then baked in a hard baking temperature higher than the pre-baking temperature. Accordingly, a vertical alignment film 26 having an identical pattern of the protrusions 14a of the pattern mold 10 is formed on the lower substrate 20 of the LCD panel as shown in FIG. 3.

After the lower substrate 20 is separated from the pattern mold 10, the pattern mold 10 is cleaned using an ultraviolet light and ozone ($O_3$) so as to be used for the next alignment film production process.

The lower substrate 20 having the vertical alignment film 26 is abutted with an upper substrate 30 on which another vertical alignment film is formed in a similar manner such that the vertical alignment films 26 and 36 of the lower and upper substrates 20 and 30 are facing each other, as shown in FIG. 4. Liquid crystal molecules 28 between the vertical alignment films 26 and 36 of the lower and upper substrate 20 and 30 are aligned in a vertical direction perpendicular to the substrates 20 and 30. In the meantime, the liquid crystal molecules 28 between a part of the lower substrate 20 on which the vertical alignment film 26 is not formed and the upper substrate 30 are aligned in a vertical direction near the upper substrate 30 and aligned in parallel with the substrates near the low substrate 20. Accordingly, the liquid crystal molecules 28 are aligned in a homeotropic mode on the region in which the vertical alignment film 26 is formed on the lower substrate 20, and aligned in a hybrid mode on the region in which the vertical alignment film 26 is not formed on the lower substrate 20, as shown in FIGS. 4 and 5. In this manner, a multi domain alignment film for aligning the liquid crystal molecules in different modes in a subpixel area is implemented.

FIG. 6 is a block diagram illustrating a procedure for producing an alignment film of an LCD device according to another exemplary embodiment of the present invention.

The procedure for producing an alignment film according to a second embodiment of the present invention is identical with the procedure according to the first embodiment except for a horizontal alignment film formed on the surface of the lower substrate. Accordingly, the same or similar parts are not explained in detail.

Referring to FIG. 6, a vertical alignment layer 16 is formed by coating a polyimide on a surface of the pattern mold 110. The pattern mold 110 having the vertical alignment layer 16 is aligned over a lower substrate 20 of the LCD panel such that the vertical alignment layer 16 faces the lower substrate 20 on which a horizontal alignment layer is formed. The lower substrate 20 is fixed on a hot plate 18 heated in a pre-backing temperature. The pattern mold 10 having the vertical alignment layer 16 is pressed on the horizontal alignment film 22 of the lower substrate 20 at the pressure provide by the gravity such that the vertical alignment layer 16 coated on the protrusions 14a of the pattern mold 10 contacts in a predetermined time to be printed on the horizontal alignment film 22 as a vertical alignment film 26. Accordingly, the vertical alignment layer 16 is printed on the horizontal alignment film 22. After printed on the horizontal alignment film 22, the vertical alignment layer 16 pre-baked in pre-baking temperature of the lower substrate 20 such that the solvent is removed, and then baked in a hard baking temperature higher than the pre-baking temperature. Accordingly, a vertical alignment film 26 is formed on the horizontal alignment film 22 of the lower substrate in the pattern identical with the protrusions 14a of the pattern mold 10.

Figure 7B:
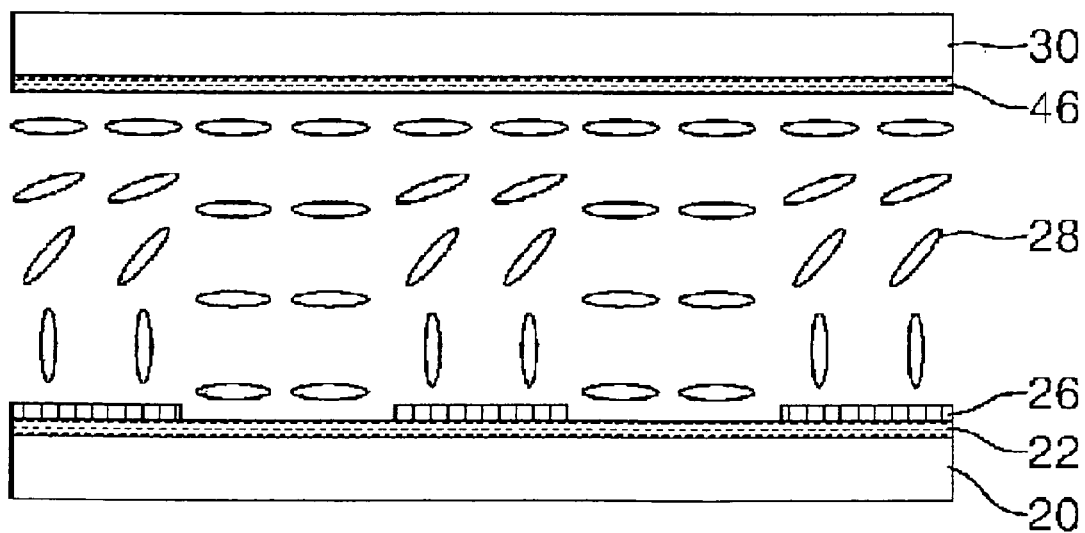
FIG. 7b is a cross sectional view illustrating an LCD device according to another exemplary embodiment of the present invention.

The lower substrate 20 having the horizontal alignment film 22 and the vertical alignment film 26 is abutted with an upper substrate 30 on which another vertical alignment film 36 or a horizontal alignment film 46 as shown in respective FIGS. 7a and 7b.

Referring to FIG. 7a, in the case that the upper substrate 30 is provided with the vertical alignment film 36, the liquid crystal molecules 28 are aligned in a vertical direction perpendicular to the substrates 20 and 30 between the vertical alignment films 26 and 36 of the lower and upper substrates 20 and 30, and aligned in the vertical direction near the upper substrate 30 and in the horizontal direction in parallel with the substrates 20 and 30 near the lower substrate 20 between the exposed horizontal alignment film 22 of the lower substrate 20 and the vertical alignment film 36 of the upper alignment film 36. In this manner, a multi domain alignment film for aligning the liquid crystal molecules in different modes in a subpixel area is implemented.

Referring to FIG. 7b, in the case that the upper substrate 30 is provided with the horizontal alignment film 46, the liquid crystal molecules 28 are aligned in a horizontal direction in parallel with the substrates 20 and 30 between the exposed horizontal alignment film 22 of the lower substrate 20 and the horizontal alignment film 46 of the upper substrate 30, and aligned in the vertical direction near the lower substrate 30 and in the horizontal direction in parallel with the upper substrate 30 near the upper substrate 20 between the vertical alignment film 26 of the lower substrate 20 and the horizontal alignment film 46 of the upper substrate 30. Accordingly, a multi domain alignment film for aligning the liquid crystal molecules in different modes in a subpixel area is implemented.

The vertical alignment film 26 printed on the horizontal alignment film 22 of the lower substrate 20 can be replaced by an alignment polymer 50 such as a polyimide or polystyrene. In this case, the alignment polymer 50 is patterned on the horizontal alignment film 22 of the lower substrate 20.

Figure 8A:
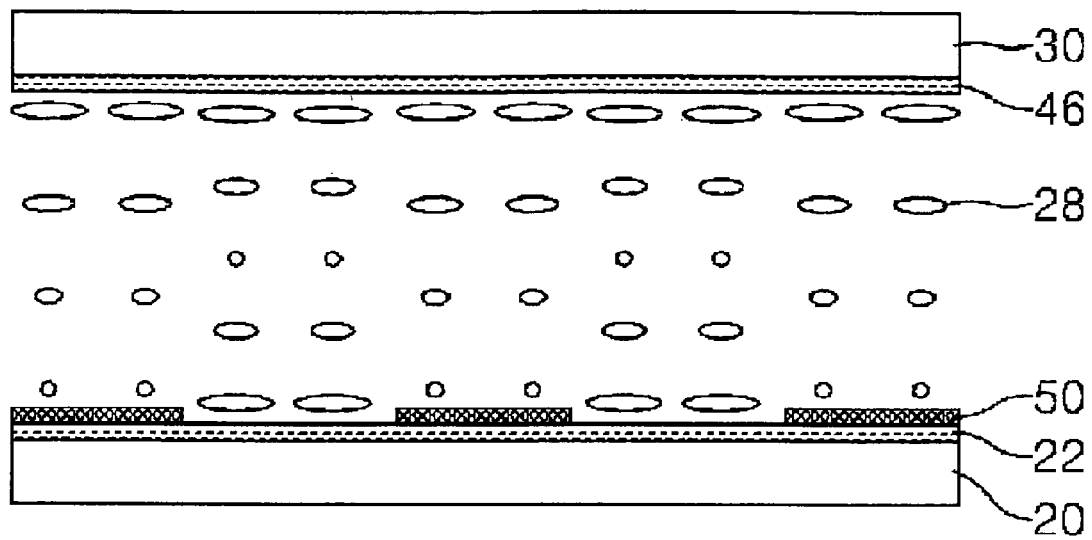
FIG. 8a is a cross sectional view illustrating an LCD device according to another exemplary embodiment of the present invention.

As shown in FIG. 8a, if the upper substrate 30 is provided with the horizontal alignment film 46 and the lower substrate 20 is provided with the patterned alignment polymer 50 formed on the horizontal alignment film 22, the liquid crystal molecules are aligned in a twisted nematic (TN) structure between the alignment polymer 50 of the lower substrate 20 and the horizontal alignment film 46 of the upper substrate 30, and aligned in an electrically controlled birefringence (ECB)

structure between the exposed horizontal alignment film 22 of the lower substrate 20 and the horizontal alignment film 46 of the upper substrate 30.

Figure 8B:
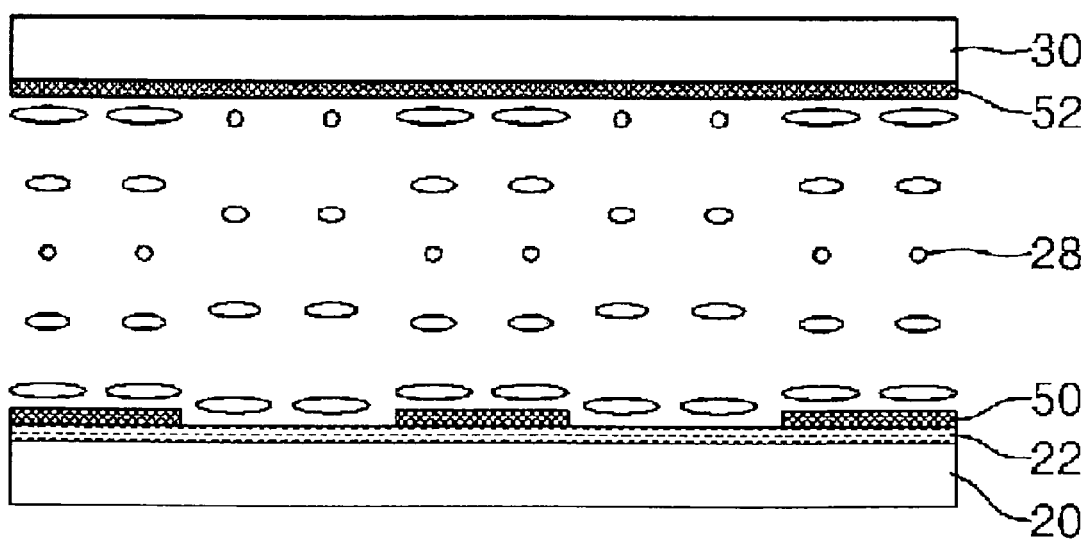
FIG. 8b is a cross sectional view illustrating an LCD device according to another exemplary embodiment of the present invention.

As shown in FIG. 8b, if the upper substrate 30 is provided with an alignment polymer 52 and the lower substrate 20 is provided with the patterned alignment polymer 50 formed on the horizontal alignment film 22, the liquid crystal molecules 28 are aligned in the TN structure between the alignment polymers 50 and 52 of the lower and upper substrates 20 and 30, and aligned in the ECB structure between the exposed horizontal alignment film 22 of the lower substrate 20 and the alignment polymer 52 of the upper substrate 30.

Figure 9:
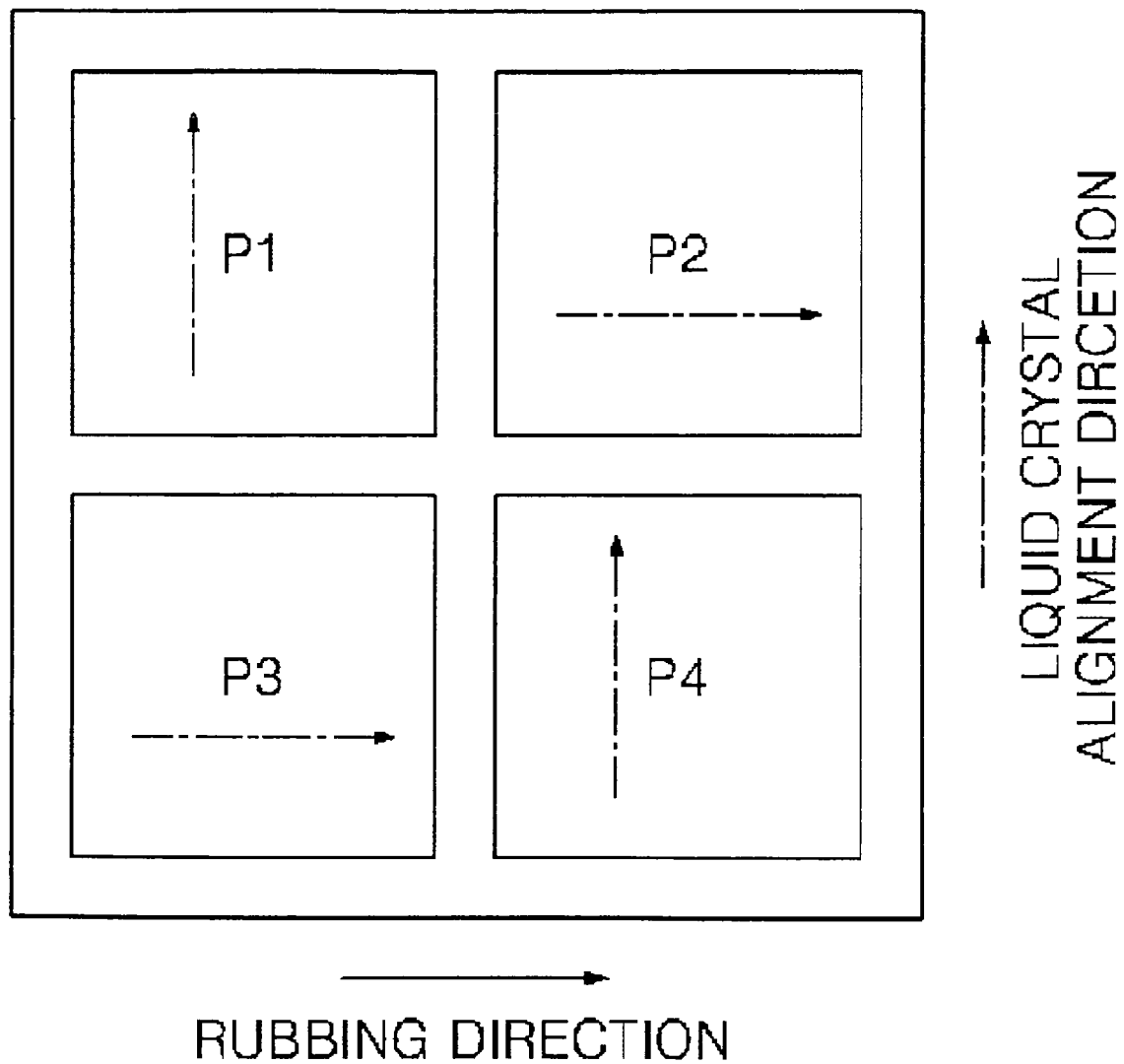
FIG. 9 is a plan view illustrating an alignment film of an LCD device according to another exemplary embodiment of the present invention.

FIG. 9 is a schematic view illustrating a lower substrate of an LCD device according to another example embodiment of the present invention.

Referring to FIG. 9, the alignment film is formed on the lower substrate such that the alignment direction of the alignment film is different at respective subpixel areas (P1 to P4). For example, the alignment film of the lower substrate is formed so as to have different alignment directions at respective subpixels (P1 to P4) using the alignment polymer and horizontal alignment film. In this case, if the upper substrate is provided with a vertical alignment film, the liquid crystal molecules at the subpixel areas are aligned in a hybrid mode with different alignment structures such that it is possible to achieve a wide viewing angle.

The alignment film is formed so as to various alignment directions in this embodiment, however, the present invention is not limited thereto, but the multi domain structure can be accomplished by applying multiple alignment materials having different pretilt angles.

INDUSTRIAL APPLICABILITY

The LCD device and method for fabricating the LCD device according to the present invention is advantageous in that a pattern mold for printing the alignment film can be repeatedly used through a cleansing process, resulting in mass production.

The invention claimed is:

1. A method for fabricating a liquid crystal display device, comprising:
producing an alignment film having multiple alignment directions; and
forming a liquid crystal layer in which liquid crystal molecules are aligned according to the multiple alignment directions;
wherein producing the alignment film includes forming a plurality of alignment patterns and exposed regions between the alignment patterns on a substrate,
wherein forming the alignment patterns comprises,
forming a pattern mold having a plurality of protrusions,
depositing an alignment material on the pattern mold,
printing the alignment material on the substrate by contacting the protrusions of the pattern mold on the substrate, and
separating the pattern mold from the substrate,
wherein the alignment patterns have different alignment direction from the exposed regions between the alignment patterns,
wherein the alignment patterns align the liquid crystal molecules in a first horizontal direction, and the exposed regions between the alignment patterns align the liquid crystal molecules in a second horizontal direction, and
wherein the alignment directions of the alignment film are different according to subpixels' positions within the liquid crystal device.

2. The method of claim 1, wherein the alignment film has multiple alignment directions for a subpixel.

3. A method for fabricating a liquid crystal display device, comprising:
forming a first alignment film having multiple alignment directions on a first substrate;
forming a second alignment film on a second substrate;
forming a liquid crystal layer between the first and the second alignment films;
wherein producing the first alignment film includes forming a plurality of alignment patterns and exposed regions between the alignment patterns,
wherein forming the alignment patterns comprises,
forming a pattern mold having a plurality of protrusions,
depositing an alignment material on the pattern mold,
printing the alignment material on the first substrate by contacting the protrusions of the pattern mold on the first substrate, and
separating the pattern mold from the first substrate,
wherein the alignment patterns have different alignment direction from the exposed regions between the alignment patterns,
wherein the alignment patterns align the liquid crystal molecules in a first horizontal direction, and the exposed regions between the alignment patterns align the liquid crystal molecules in a second horizontal direction, and
wherein the alignment directions of the alignment film are different according to subpixels' positions within the liquid crystal device.

4. A liquid crystal display device comprising:
a first alignment film having multiple alignment directions on a first substrate;
a second alignment film on a second substrate; and
a liquid crystal layer between the first and the second alignment films;
wherein the first alignment film includes a plurality of alignment patterns and exposed regions between the alignment patterns,
wherein the alignment patterns have different alignment direction from the exposed regions between the alignment patterns,
wherein the alignment patterns align the liquid crystal molecules in a first horizontal direction, and the exposed regions between the alignment patterns align the liquid crystal molecules in a second horizontal direction, and
wherein the alignment directions of the alignment film are different according to subpixels' positions within the liquid crystal device.

5. The liquid crystal display of claim 4, wherein the liquid crystal molecules are aligned in a homeotropic mode, a horizontal mode, a hybrid mode, a twisted nematic (TN) mode or an electrically controlled birefringence (ECB) mode.

6. The method of claim 1, wherein producing the alignment film further comprises forming a base alignment layer on the substrate before forming the alignment patterns.

7. The method of claim 1, wherein the alignment film has a first alignment domain and a second alignment domain having a different pretilt angle from that of the first alignment domain.

8. The method of claim 3, wherein producing the first alignment film comprises forming a base alignment layer on the first substrate before forming the alignment patterns.

9. The method of claim 3, wherein the alignment patterns and the exposed regions between the alignment patterns form a plurality of first alignment domains and a plurality of second alignment domains, respectively, and the second alignment domains have different pretilt angle from that of the first alignment domains.

10. The liquid crystal display device of claim 4, wherein the alignment patterns and the exposed regions between the alignment patterns form a plurality of first alignment domains and a plurality of second alignment domains, respectively, and the second alignment domains have a different pretilt angle from that of the first alignment domains.

11. The liquid crystal display device of claim 4, wherein the first alignment film has a base alignment layer under the alignment patterns.

* * * * *